(12) United States Patent
Stuntebeck

(10) Patent No.: US 10,362,065 B2
(45) Date of Patent: *Jul. 23, 2019

(54) MANAGEMENT OF ACTIONS INITIATED BY APPLICATIONS IN CLIENT DEVICES

(71) Applicant: AirWatch LLC, Atlanta, GA (US)

(72) Inventor: Erich Stuntebeck, Johns Creek, GA (US)

(73) Assignee: AIRWATCH LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/850,945

(22) Filed: Dec. 21, 2017

(65) Prior Publication Data

US 2018/0139244 A1    May 17, 2018

Related U.S. Application Data

(62) Division of application No. 14/573,494, filed on Dec. 17, 2014, now Pat. No. 9,866,589.

(51) Int. Cl.
*H04L 29/06* (2006.01)
*G06F 21/62* (2013.01)
*H04L 12/58* (2006.01)
*G06F 21/55* (2013.01)

(52) U.S. Cl.
CPC ............ *H04L 63/20* (2013.01); *G06F 21/554* (2013.01); *G06F 21/62* (2013.01); *G06F 21/6236* (2013.01); *H04L 51/12* (2013.01); *H04L 63/104* (2013.01)

(58) Field of Classification Search
CPC ....... H04L 63/20; H04L 63/104; H04L 51/12; G06F 21/6236; G06F 21/554; G06F 21/62
See application file for complete search history.

(56) References Cited

U.S. PATENT DOCUMENTS

| | | | |
|---|---|---|---|
| 8,112,482 B1* | 2/2012 | Geddes | H04L 51/00 709/206 |
| 8,875,243 B1 | 10/2014 | Cherukumudi et al. | |
| 10,044,719 B2* | 8/2018 | Desai | H04L 63/101 |
| 2004/0092273 A1 | 5/2004 | Valloppillil | |
| 2004/0098472 A1 | 5/2004 | Styles et al. | |
| 2004/0181581 A1 | 9/2004 | Kosco | |
| 2005/0182964 A1* | 8/2005 | Jooste | G06F 21/53 726/22 |
| 2007/0226800 A1* | 9/2007 | Nichols | G06F 21/566 726/24 |
| 2007/0261099 A1* | 11/2007 | Broussard | H04L 63/102 726/1 |
| 2008/0046983 A1 | 2/2008 | Lester et al. | |
| 2009/0222901 A1 | 9/2009 | Schneider | |
| 2010/0293238 A1 | 11/2010 | Nottingham et al. | |
| 2011/0113109 A1 | 5/2011 | LeVasseur et al. | |
| 2012/0023573 A1* | 1/2012 | Shi | G06F 3/04883 726/17 |

(Continued)

*Primary Examiner* — Morshed Mehedi
(74) *Attorney, Agent, or Firm* — Thomas Horstemeyer, LLP

(57) ABSTRACT

A client device identifies an action being performed using a first application in the client device. The client device identifies that the first application is not authorized to be used to perform the action. In response, the client device identifies a second application that is authorized to perform the action. The client device also facilitates the second application being used to perform the action.

20 Claims, 7 Drawing Sheets

(56) References Cited

U.S. PATENT DOCUMENTS

| | | | |
|---|---|---|---|
| 2013/0133061 A1* | 5/2013 | Fainkichen | H04W 76/10 |
| | | | 726/15 |
| 2013/0212575 A1* | 8/2013 | Ito | G06F 12/1475 |
| | | | 718/1 |
| 2013/0232573 A1* | 9/2013 | Saidi | G06F 21/6218 |
| | | | 726/22 |
| 2014/0101716 A1* | 4/2014 | Touboul | H04L 63/0236 |
| | | | 726/1 |
| 2014/0165213 A1 | 6/2014 | Stuntebeck | |
| 2014/0310765 A1* | 10/2014 | Stuntebeck | H04L 63/102 |
| | | | 726/1 |
| 2016/0350535 A1* | 12/2016 | Garcia | G06F 21/572 |
| 2017/0251013 A1* | 8/2017 | Kirti | H04L 63/1416 |

\* cited by examiner

MANAGEMENT OF ACTIONS INITIATED BY APPLICATIONS IN CLIENT DEVICES

CROSS-REFERENCE TO RELATED APPLICATIONS

This application is a divisional of, and claims priority to, co-pending U.S. patent application entitled "MANAGEMENT OF ACTIONS INITIATED BY APPLICATIONS IN CLIENT DEVICES," filed on Dec. 17, 2014, and assigned application Ser. No. 14/573,494, which is incorporated herein by reference in its entirety.

BACKGROUND

An individual may use a client device, such as a mobile phone or tablet computer, for various purposes. For example, an individual may use a client device to access content for leisure or other personal reasons. In addition, an individual may use the same client device to access content that is associated with an enterprise, such as an employer of the individual.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure is directed towards managing actions that are initiated by an application executed in a client device. In one example, a user attempts to compose and/or transmit a work-related email message using an email client that is not authorized to be used for work-related email messages. A management component executed in the client device detects that the unauthorized email client is being used for a work-related email message, and in response, the management component prompts the user to use an authorized email client to compose and/or transmit the email message. The authorized email client is forced to operate in accordance with one or more compliance rules that reduce the risk of work-related content, such as confidential documents, being accessible to unauthorized individuals or systems. In addition, the management component automatically copies content that was previously created using the unauthorized email client so that it is processed and transmitted using the authorized email client. In this way, various embodiments facilitate use of the authorized email client and thereby reduce the risk of work-related content being improperly accessed by unauthorized individuals or systems.

In another example, a user operates a browser application to attempt to post work-related content to a social networking site. The management component executed in the client device detects that the user is attempting to post work-related content to the social networking site and in response, redirects the browser to another social networking site. The system that provides the social networking site to which the browser is redirected monitors content posted by users, employs content controls, and enacts particular security and privacy protocols. Thus, various embodiments direct the browser to an alternative social networking site that employs additional or alternative security and privacy controls.

Figure 1:
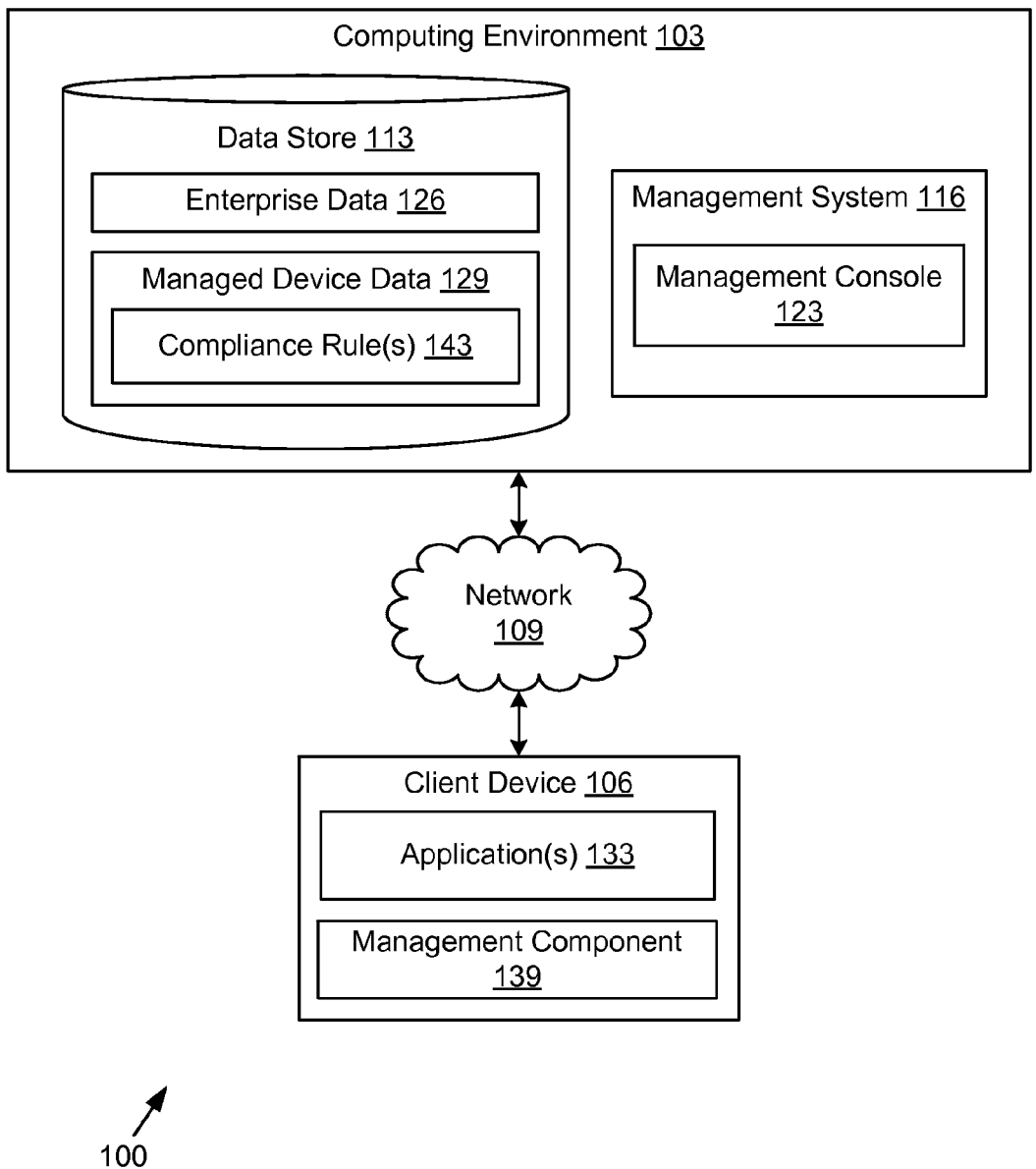
FIG. 1 is a drawing of a networked environment according to various embodiments of the present disclosure.

With reference to FIG. 1, shown is a networked environment 100 according to various embodiments. The networked environment 100 shown in FIG. 1 includes a computing environment 103, and a client device 106, which are in data communication with each other over a network 109. The network 109 includes, for example, the Internet, one or more intranets, extranets, wide area networks (WANs), local area networks (LANs), wired networks, wireless networks, or any combination of two or more such networks. Such networks may comprise satellite networks, cable networks, Ethernet networks, or telephony networks.

The computing environment 103 comprises, for example, a server computer. Alternatively, the computing environment 103 employs multiple computing devices that are arranged, for example, in one or more server banks or computer banks. Such computing devices may be located in a single installation or may be distributed among many different geographical locations. In one example, the computing environment 103 includes multiple computing devices that together form a hosted computing resource or a grid computing resource. In some cases, the computing environment 103 operates as at least a portion of an elastic computing resource where the allotted capacity of processing, network, or storage vary over time. In one example, the computing environment 103 includes or is operated as one or more virtualized computer instances that are executed in order to perform the functionality that is described herein.

Various systems and other functionality are executed in the computing environment 103. Also, various data is stored in a data store 113 that is accessible to the computing environment 103. The data store 113 is representative of multiple data stores 113. The data stored in the data store 113 is associated with the operation of the various systems and functional entities described below.

A management system 116 is executed in the computing environment 103 to manage and oversee the operation of multiple client devices 106. In some embodiments, an enterprise, such as one or more companies or other organizations, operates the management system 116 to oversee and manage the operation of the client devices 106 of its employees, contractors, and customers.

The management system 116 includes a management console 123 that facilitates administration of devices of an enterprise by administrators via the management system 116. For example, the management console 123 generates one or more user interfaces that are rendered on a display device to facilitate interaction with the management system 116. Such user interfaces facilitate an administrator's inputting of commands or other information for the management system 116. Additionally, the user interfaces include presentations of statistics or other information regarding the client devices 106 that are managed by the management system 116.

The data stored in the data store 113 includes enterprise data 126 and managed device data 129. The enterprise data 126 includes data that is associated with the enterprise that operates the management system 116. In one example, the enterprise data 126 includes word processing documents, spreadsheets, presentation documents, accounting records, and employee records. The enterprise takes steps to restrict access to at least a portion of the enterprise data 126. For example, proper credentials, such as a username and password, are required for a client device 106 to be authorized to access at least some of the enterprise data 126.

The managed device data 129 includes information regarding the client devices 106 that are managed and controlled by the management system 116. Such managed device data 129 for a particular client device 106 includes, for example, the identification of a user assigned to the client device 106, the identification of the applications 133 that are installed in the client device 106, and historical data regarding the operation of the client device 106.

In addition, the managed device data 129 for a particular client device 106 includes a set of one or more compliance rules 143 that are specified by the management system 116. Each compliance rule 143 specifies one or more conditions that must be satisfied for a client device 106 to be deemed complaint with the compliance rule 143. In one example, a compliance rule 143 specifies that particular applications 133 are prohibited from being installed on a client device 106. In one such example, a compliance rule 143 specifies that a native email application for the client device 106 is not permitted to be used for composing emails that are associated with the enterprise that provides the management system 116 and that a particular application that is provided by the enterprise is required to be used for such emails. As another example, a compliance rule 143 specifies that a passcode is required to unlock a lock screen on a client device 106. Additionally, one or more compliance rules 143 are based on time, geographical location, or other predefined conditions. As one example, a compliance rule 143 that is based on geographical location specifies that certain functionality of the client device 106 is permitted or restricted while the client device 106 is within a particular location.

The client device 106 is representative of multiple client devices 106 that are coupled to the network 109. The client device 106 comprises, for example, a processor-based system such as a computer system. Such a computer system is embodied in the form of a desktop computer, a laptop computer, a personal digital assistant, a mobile phone (e.g., a "smartphone"), a set-top box, a music player, a web pad, a tablet computer system, a game console, or an electronic book reader. The client device 106 includes a display as well as one or more input devices, such as a mouse or a touch pad, that facilitates a user input or other types of data input into the client device 106.

The client device 106 is configured to execute one or more applications 133 and a management component 139. An application 133 comprises, for example, one or more programs that cause various operations to be performed when executed in the client device 106. Examples of an application 133 include an email client, a dialer that that is used to dial telephone numbers, a word processor, an image or video viewer, an audio player, or a browser, such as a "web browser." In some examples, each application 133 also generates one or more user interfaces that facilitate user interaction with and control of the client device 106.

The management component 139 is executed in the client device 106 to monitor and manage at least a portion of the resources, such as data, applications 133, and hardware components, for the client device 106. The management component 139 also identifies whether the client device 106 is operating in accordance with the one or more compliance rules 143 that have been assigned to the client device 106. Additionally, as will be described in further detail below, the management component 139 identifies one or more actions being performed using an application 133 and determines whether that application 133 is authorized by the management system 116 to perform those one or more actions. Examples of actions that are performed using an application 133 include initiating a telephone call, posting a message to a network page of a network site, or composing a message, such as an email message, a short message service (SMS) message, or a multimedia messaging service (MMS) message.

In one example, the management component 139 functions as a device management service that operates as a portion of an operating system for the client device 106. In another example, the management component 139 functions as a device management agent that operates in the application layer of the client device 106 and that monitors at least some of the activity being performed in the client device 106. In another example, the management component 139 comprises an application wrapper that interfaces with a software component to facilitate overseeing, monitoring, and managing one or more resources of the client device 106. Alternatively, the management component 139 is a portion of an application 133 that was developed, for example, using a Software Development Kit (SDK) that facilitates the inclusion of functionality within the application 133 that monitors and/or manages at least a portion of the resources for the client device 106.

In some examples, the management component 139 is executed by the client device 106 automatically upon startup of the client device 106. In other examples, the management component 139 runs as a background process in the client device 106. Accordingly, the management component 139 executes without user intervention in some examples. Additionally, in some examples, the management component 139 communicates with the management system 116 in order to facilitate the management system 116 managing the client device 106.

Next, a general description of the operation of the various components of the networked environment 100 is provided. To begin, the client device 106 is powered on, and the management component 139 begins executing in the client device 106. As previously mentioned, the management component 139 in some examples executes as a background process in the client device 106 without any user intervention.

While executing, the management component 139 observes the data being processed by an application 133 to identify an action that is being performed using the application 133. In one example, the management component 139 is provided with information specifying that a particular application 133 is being used to process messages, such as an email message, an SMS messages, or an MMS message, and the management component 139 observes the data that is being input by a user into a user interface for the application 133.

In one example, the management component 139 acts as a keystroke logger and records the characters that are being input for a message body field, subject line field, and intended recipient(s) field. In another example, the management component 139 extracts data that has been previously input by a user into a user interface for the application 133. In other examples, the management component 139 acts as a proxy through which outbound traffic, such as messages, from the application 133 pass, and the management component 139 extracts the data that corresponds to various data fields.

In one example, the management component 139 comprises a keyboard application. The management system 116 or the management component 139 enforces a compliance rule 143 that requires the keyboard application to be used by a user to input text or other information into the client device 106. When a user inputs text or other information into the client device 106 using the keyboard application, the management component 139 collects and processes the input data as described below.

The management component 139 uses the obtained data to identify an action that is being performed using the application 133. In one example, the action that is being performed using the application 133 is identified based on the content of the message. For instance, the management component 139 compares the data that has been obtained to a list of predefined words or phrases that are indicative of the content of a message. As an example, if the body of a message includes the phrase "document from work," the management component 139 concludes that the application 133 is being used to process a message that is associated with the enterprise that operates the management system 116. Thus, the management component 139 uses the content of a message to identify an action that is being performed using the application 133. In the example provided above, the management component 139 uses the content of a message to identify that a message associated with the enterprise is being composed and transmitted using a particular application 133.

Alternatively, the management component 139 identifies an action based on one or more intended recipients of a message. For example, using one or more of the mechanisms for obtaining the data described above, the management component 139 obtains contact information, such as the email address, email address domain name, or phone number, of one or more of the intended recipients of the message. Once the contact information for one or more intended recipients has been obtained, the management component 139 compares the contact information with a list of contact information for individuals and entities that are known to be associated with the enterprise that operates the management system 116. This list of contact information includes, for example, the email addresses and phone numbers of employees of the enterprise or other individuals or entities, such as vendors, contractors, or customers, that have previously interacted with the enterprise. To obtain the contact information, the management system 116 of the management component 139 in some examples is integrated with contact list that is generated by a directory service, such as an ACTIVE DIRECTORY or a SALESFORCE directory service, that includes contact information for employees, customers, and business partners. In other examples, the management component 139 creates a list of contact information for individuals and entities that are associated with the enterprise. If one or more of the intended recipients match the contact information in the list of individuals or entities known to be associated with the enterprise, the management component 139 concludes that the application 133 is being used to compose or transmit a message that is associated with the enterprise. Thus, the management component 139 uses the content of the message to identify an action that is being performed using the application 133. In the example provided above, the management component 139 uses the identified intended recipients to identify that a particular application 133 is being used to compose or transmit a message associated with an enterprise.

In some examples, a user associates a data resource, such as a document or image with a message as an "attachment." For such an example, the management component 139 processes the attachment to identify an action that being performed using the application 133. For example, the management component 139 compares a file name, or a portion of a file name, of the attachment to a list of file names, words, and acronyms that are known to be associated with the enterprise that operates the management system 116. In addition, the management component 139 performs optical character recognition (OCR) or other content recognition processing techniques to identify content in the attachment. The management component 139 compares the identified content with a list of content that is known to be associated with the enterprise that operates the management system 116. If the file name or the identified content for the attachment match the content in the list, or if metadata for the file specifies that the attachment was obtained from an enterprise source, the management component 139 concludes that the application 133 is being used to compose or transmit a message that is associated with the enterprise. Thus, the management component 139 processes an attachment for a message to identify an action that is being performed using the application 133. In the example provided above, the management component 139 processes the attachment to identify that a message associated with an enterprise is being composed or transmitted using a particular application 133.

As mentioned above, the management component 139 also identifies whether the client device 106 is operating in compliance with the compliance rules 143 that are assigned to the client device 106. In one example, a compliance rule 143 specifies that a particular application 133 is not authorized to be used to perform a particular action. Is another example, a compliance rule 143 specifies that a particular application 133 is authorized to be used to perform the particular action. Thus, in some examples, a compliance rule 143 specifies that a native email client, such as, a "default" email client that is provided by the manufacturer of the client device 106, is not authorized to be used to compose or transmit email messages that are associated with the enterprise, and that an enterprise email client, such as a "secured" email client provided by the management system 116, is authorized to compose and transmit email messages that are associated with the enterprise. In other examples, a compliance rule 143 specifies that an email client is authorized to compose and transmit email messages after the email client has been configured with particular settings that are specified by the management system 116.

In another example, a compliance rule 143 specifies that a native dialer, such as a "default" application 133 that is provided by the manufacturer of the client device 106 that is used to make telephone calls, is not authorized to be used to make telephone calls to phone numbers associated with the enterprise, and that an enterprise dialer, such as a "secured" dialer that is provided by the management system 116, is authorized to be used to make telephone calls to phone numbers associated with the enterprise.

After the management component 139 has identified an action that is being performed using a particular application 133, the management component 139 compares the identified action to the compliance rules 143 that are assigned to the client device 106 to identify whether that application 133 is authorized to perform the action. For example, if the management component 139 identified that a native email client is being used to compose or transmit an enterprise email message, the management component 139 consults the compliance rules 143 to determine whether the management system 116 authorizes the native email client being used to perform that action.

If the management component 139 determines that a compliance rule 143 does not authorize an identified action to be performed using the application 133 that is being used to perform the action, the management component 139 initiates a remedial action. In one example, the management component 139 causes a notification to be transmitted to the management system 116 so that the management system 116 is informed about the unauthorized action. In another example, the management component 139 renders a message for display by the client device 106 to notify the user of the client device 106 of the unauthorized activity being performed.

Furthermore, in some examples, the management component 139 consults the compliance rules 143 to identify whether there are one or more other applications 133 that are authorized by the management system 116 to be used to perform the action. If the management component 139 identifies that another application 133 is authorized to be used to perform the action, the management component 139 facilitates the other application 133 being used to perform the action. For example, in response to identifying that an unauthorized application 133 is being used to compose or transmit an enterprise email message, the management component 139 facilitates an authorized application 133 being used to compose or transmit the enterprise email message.

In some examples, the management component 139 facilitates the authorized application 133 being used to compose or transmit a message only if criteria specified by a compliance rule 143 are satisfied. In one example, such criteria specifies that the client device 106 must be in communication with a particular network, such as a non-enterprise network, in order for the management component 139 to facilitate the authorized application 133 being used. In another example, a compliance rule 143 specifies that the management component 139 facilitates the authorized application 133 being used only if the client device 106 is located in a particular location, such as a location that is not on the premises of the enterprise. In another example, a compliance rule 143 specifies that the management component 139 facilitates the authorized application 133 being used only if the current time is outside of a defined time window, such as outside a defined "standard" workday.

The management component 139 facilitates another application 133 being used to perform an action in various ways. In one example, the management component 139 causes a notification to be rendered for display by the client device 106, and the notification prompts the user of the client device 106 to switch to the authorized application 133 in order to perform the action. In some examples, content that was generated using the unauthorized application 133 is copied so that the authorized application 133 is able to process the content. In one example, information for the body, subject line, intended recipients, or attachments of an email message that was generated using an unauthorized email client are copied and inserted into the corresponding input fields of an authorized email client. In this way, the content that a user generated using an unauthorized application 133 is automatically transferred for use by an authorized application 133.

In one example, the application 133 comprises a browser application, such as a web page browser. The management component 139 observes the data being processed by the browser and identifies an action being performed using the browser. For example, the management component 139 obtains an identifier, such as a domain name, for the web page that is being accessed by the browser. The management component 139 compares the obtained web page identifier with a list of web page identifiers that are known to be associated with various types of network sites. For example, the management component 139 compares the obtained web page identifier with a list of web page identifiers that are known to be associated with social networking sites. If the identifier for the web page matches an identifier that is in the list, the management component 139 concludes that the application 133 is being used to access a social network.

In addition, using one or more of the mechanisms for obtaining data that were discussed above, the management component 139 also identifies that the browser is being used to provide content associated with the enterprise the operates the management system 116 to the identified network site. For example, the management component 139 compares text that was input to the web page browser to a list of words or phrases that are indicative of enterprise content. As one example, the management component 139 concludes that the name of a secret enterprise project, "Project Xylophone" indicates that the browser is being used to provide content associated with the secret project to a network site. Thus, the management component 139 identifies a network site being accessed by the browser, identifies content being provided to the network site, and identifies an action being performed using the browser based on this information.

As mentioned above, the management component 139 also identifies whether the client device 106 is operating in compliance with the compliance rules 143 that are assigned to the client device 106. In one example, a compliance rule 143 specifies that a client device 106 is not authorized to be used to provide enterprise content to a particular network site. Accordingly, after the management component 139 has identified that a browser is being used to provide content to a particular network site, the management component 139 compares the identified action to the compliance rules 143 that are assigned to the client device 106 to determine whether the client device 106 is authorized to perform the action.

If the management component 139 identifies that the client device 106 is not authorized to perform an identified action, such as, for example, providing enterprise content to a social networking site, the management component 139 responds in various ways. For example, in one example, the management component 139 causes a notification to be transmitted to the management system 116 so that the management system 116 is informed about the unauthorized action. Additionally, the management component 139 renders a message for display by the client device 106 to notify the user of the client device 106 of the unauthorized activity being performed.

Furthermore, in some examples, the management component 139 consults the compliance rules 143 to identify whether the management system 116 authorizes the client device 106 to provide the identified content to one or more other network sites. In one example, the management system 116 does not authorize the client device 106 to provide enterprise content to a first social networking site, but the management system 116 does authorize the client device 106 to provide enterprise content to a second social networking site, such as a social networking site that is operated in conjunction with the enterprise, such as the SOCIAL-CAST social networking site. In such an example, the system that provides the enterprise social networking site monitors content posted by users, employs content controls, enacts security and privacy protocols, and provide other features that make the enterprise social networking site more secure relative to one or more other social networking sites, such as the FACEBOOK social networking site.

If the compliance rules 143 indicate that the management system 116 does authorize the client device 106 to provide the identified content to another network site, the management component 139 facilitates the content being provided to the other network site in various ways. In one example, the management component 139 causes a notification to be displayed by the client device 106, and the notification prompts the user of the client device 106 to access the other network site. Alternatively, the management component 139 automatically directs the browser to the other network site. Additionally, in some examples, the content that was generated for the unauthorized network site is copied by the management component 139 so that the content is provided to the authorized network site.

Figure 2:
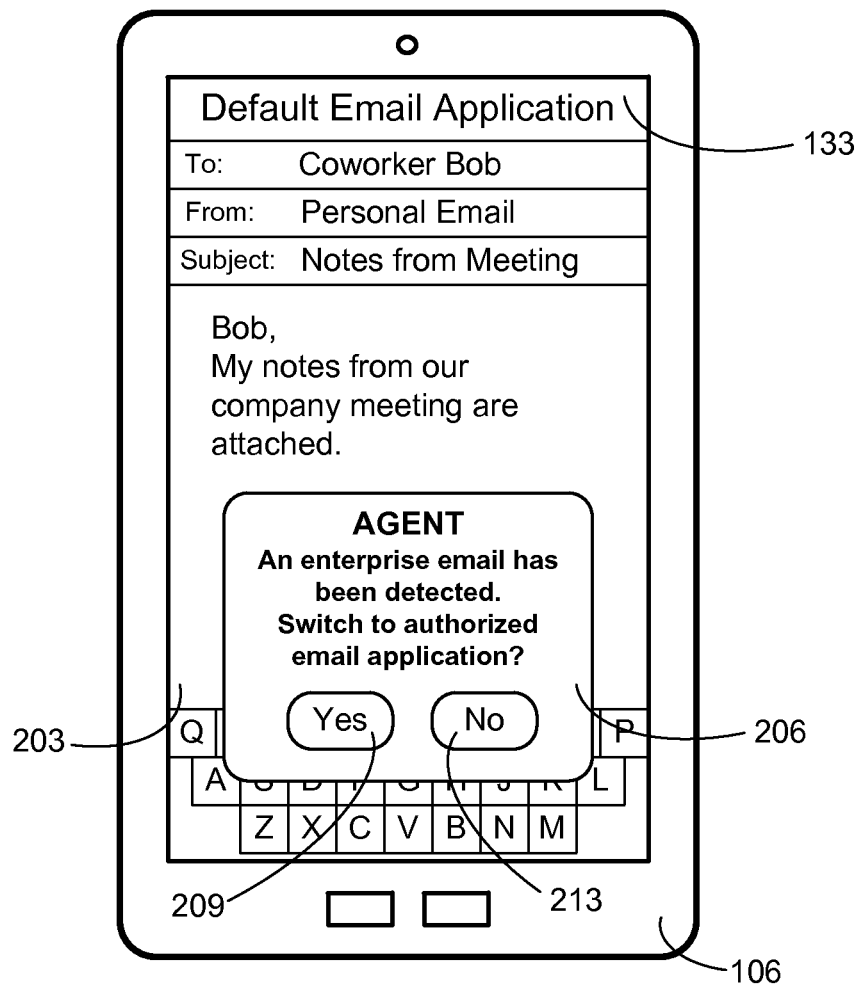
FIGS. 2-4 are drawings of user interfaces that may be encoded and rendered by a client device in the networked environment of FIG. 1 according to various embodiments of the present disclosure.

Referring next to FIG. 2, shown is an illustration of an example of a user interface 203 that has been encoded and rendered by the client device 106. In the example illustrated in FIG. 2, the management component 139 (FIG. 1) has detected that an application 133 is being used to compose and transmit an email message that is associated with the enterprise that operates the management system 116 (FIG. 1). The management component 139 has detected that the application 133 is being used to compose and transmit an enterprise email by, for example, comparing information for the intended recipients, the subject line, the body, or the attachments with a list of contacts, keywords, or file names that are known to be associated with the enterprise, as discussed above.

Additionally, the management component 139 has compared the identified action (i.e., composing an enterprise email message using the application 133) to the compliance rules 143 (FIG. 1) assigned to the client device 106 and has identified that that the management system 116 does not authorize that particular application 133 to be used to perform that action. In response, the management component 139 has generated a notification 206 that prompts a user to use an authorized application 133 to perform the action.

In the embodiment illustrated in FIG. 2, the notification 206 includes a yes button 209 and a no button 213. If the no button 213 is selected by the user, the notification 206 may disappear, and the management component 139 may notify the management system 116 that the unauthorized application 133 is being used to perform the action. If the yes button 209 is selected by the user, an authorized application 133 may become active in the client device 106, and the user may use the authorized application 133 to perform the action.

Figure 3:
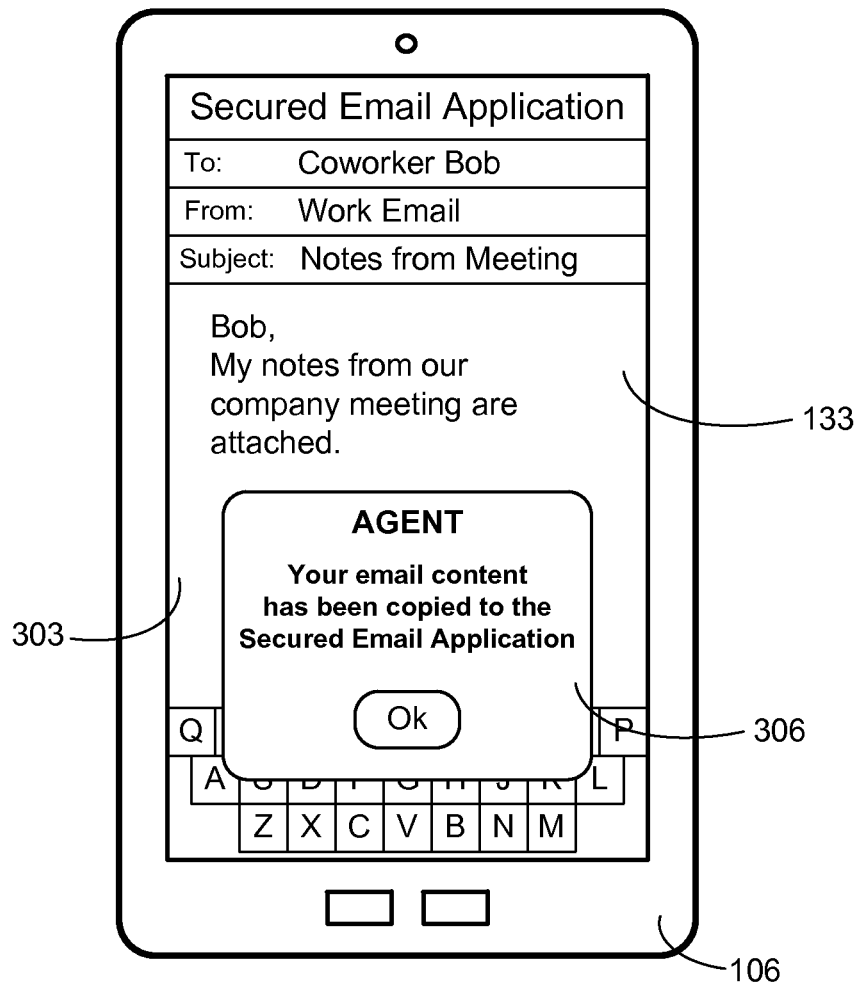

With reference to FIG. 3, shown is an illustration of an example of a user interface 303 that may be encoded and rendered by the client device 106 according to various embodiments of the present disclosure. The user interface 303 may be encoded and rendered in response to, for example, a user selecting the yes button 209 (FIG. 2) of the user interface 203 illustrated in FIG. 2.

As illustrated in FIG. 3, the management component 139 (FIG. 1) has caused an authorized application 133 to become active in the client device 106. In addition, content, such as the email address information for the intended recipients, the subject line, and the body of the email message, that was generated using the unauthorized application 133 has been copied and inserted into the corresponding input fields of the user interface 303 for use by the authorized application 133. In this way, the management component 139 further facilitates the authorized application 133 processing content that was generated using the unauthorized application 133.

Additionally, the management component 139 has caused a notification 306 to be generated. The notification 306 informs a user that content that was generated using the unauthorized application 133 has been copied for use by the authorized application 133.

Figure 4:
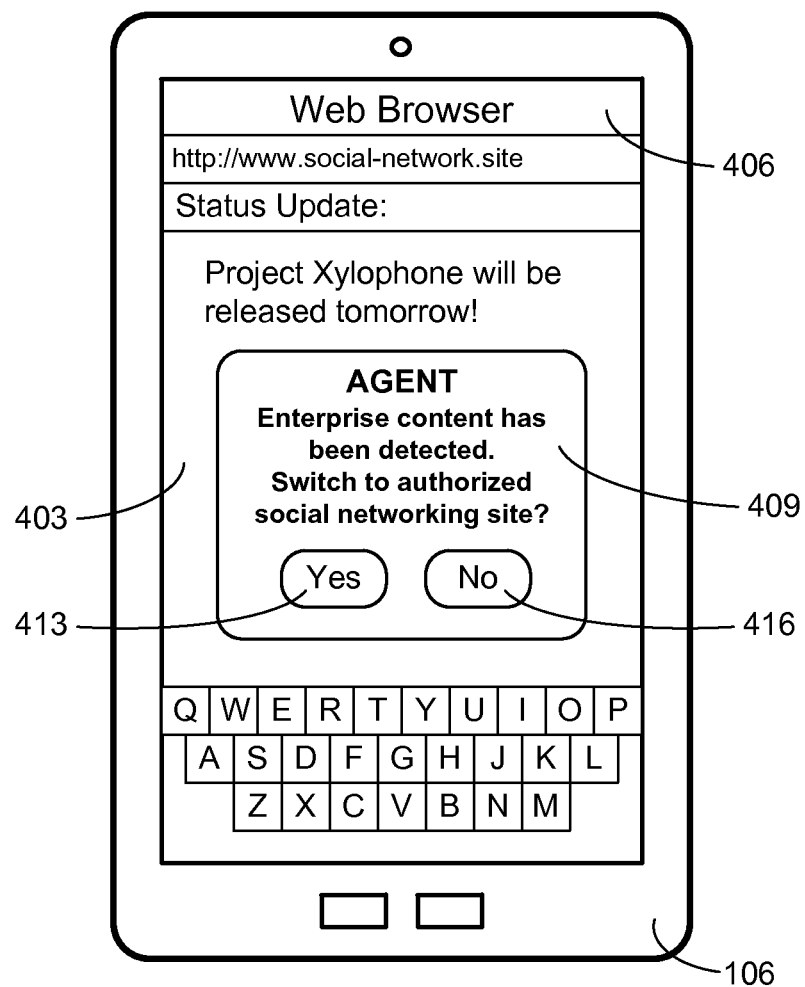

With reference to FIG. 4, shown is an illustration of an example of a user interface 403 that may be encoded and rendered by the client device 106 according to various embodiments of the present disclosure. In the embodiment illustrated in FIG. 4, the management component 139 (FIG. 1) has detected that a browser 406 is being used to provide content to a network site and that the content is associated with the enterprise that operates the management system 116 (FIG. 1). Furthermore, the management component 139 has identified that the compliance rules 143 (FIG. 1) assigned to the client device 106 indicate that the management system 116 does not authorize the client device 106 to provide content associated with the enterprise to the network site.

In response to identifying that the management system 116 does not authorize the client device 106 to provide content associated with the enterprise to the network site, the management component 139 has caused a notification 409 to be generated. The notification 409 informs a user that the client device 106 is not authorized to provide the content to the network site.

In addition, the notification 409 includes a yes button 413 and a no button 416. If a user selects the no button 416, the notification 409 may disappear, and the management component 139 may notify the management system 116 that the client device 106 is being used to provide content associated with the enterprise to the unauthorized network site. In some examples, the management system 116 causes other remedial actions to be initiated, such as deleting data on the client device 106 or locking the client device 106.

If a user selects the yes button 413, the management component 139 consults the compliance rules 143 and identifies whether the management system 116 authorizes the content to be provided to an alternative network site. If the management system 116 does authorize the content to be provided to another network site, the management component 139 directs the browser 406 to the other network site. In addition, the management component 139 copies the content that was to be provided to the unauthorized network site so that the browser 406 provides that content to the authorized network site.

Figure 5:
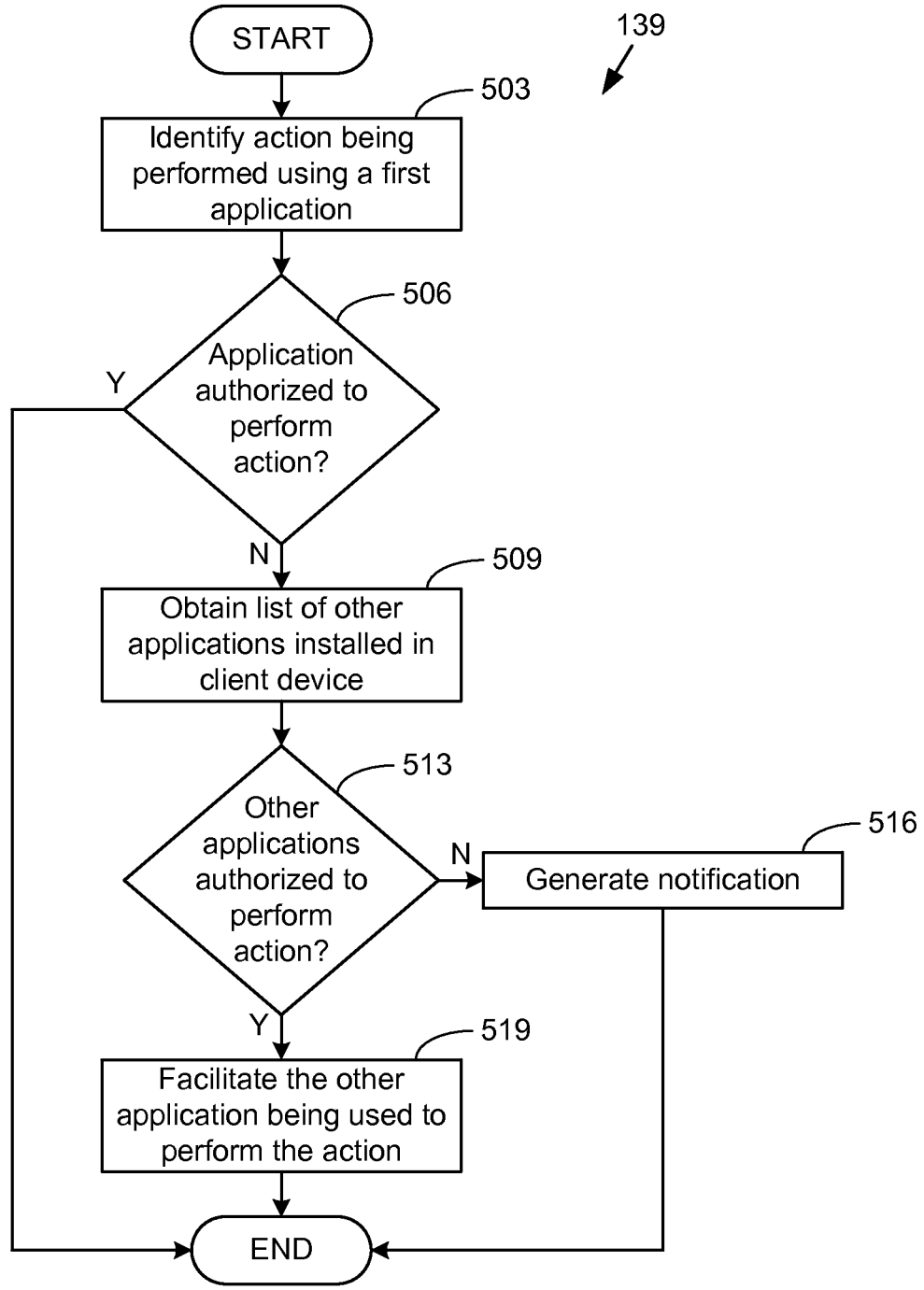
FIGS. 5-6 are flowcharts illustrating examples of functionality of a management component in the client device of the networked environment of FIG. 1 according to various embodiments of the present disclosure.

With reference to FIG. 5, shown is a flowchart that provides an example of the operation of a portion of the management component 139. In particular, FIG. 5 provides an example of the management component 139 identifying that a first application 133 (FIG. 1) is not authorized to be used to perform a particular action and in response, facilitating a second application 133 being used to perform the action. It is understood that, in other examples, the management component 139 prevents the first application 133 from being used to perform a particular action regardless of whether a second application 133 is identified for performing the action. It is understood that the flowchart of FIG. 5 provides merely an example of the many different types of functional arrangements that may be employed to implement the operation of the portion of the management component 139 as described herein. As an alternative, the flowchart of FIG. 5 may be viewed as depicting an example of elements of a method implemented in the client device 106 (FIG. 1) according to one or more examples.

Beginning with element 503, the management component 139 identifies an action that is being performed using a first application 133. As discussed above, the management component 139 identifies the action based on, for example, the content of a message or the intended recipients of a message. Examples of actions that are identified include using a particular application 133 to compose or transmit a message, initiate a telephone call, or post a message to a network page of a network site.

At element 506, the management component 139 identifies whether the application 133 is authorized to be used to perform the identified action. In some examples, the management component 139 compares the identified action to the compliance rules 143 (FIG. 1) assigned to the client device 106 in order to identify whether the application 133 is authorized to be used to perform the action. As discussed above, the compliance rules 143 indicate whether the management system 116 authorizes one or more particular applications 133 being used to perform various actions.

If the management component 139 identifies that the application 133 is authorized to be used to perform the identified action, the process ends, as shown in FIG. 5. Otherwise, if the management component 139 identifies that the application 133 is not authorized to be used to perform the action, the management component 139 moves to element 509 and obtains a list of one or more other applications 133 that are installed in the client device 106.

As indicated at element 513, the management component 139 then identifies whether one or more other applications 133 in the list are authorized to be used to perform the action. To this end, the management component 139 consults the compliance rules 143 to identify whether each application 133 in the list is authorized to be used to perform the action identified in element 503. If there are no applications 133 that are authorized to be used to perform the action, the management component 139 moves to element 516 and generates a notification. The notification is transmitted to the management system 116, for example, to notify the management system 116 of the unauthorized usage of the application 133. Alternatively, the notification is presented to a user of the client device 106 to notify the user of the unauthorized usage of the application 133.

If there are one or more applications 133 that are authorized to be used to perform the identified action, the management component 139 moves from element 513 to element 519. As illustrated at element 519, the management component 139 then facilitates the authorized application 133 being used to perform the action. For cases in which multiple applications 133 are identified as being authorized to be used to perform the action, the management component 139 selects one of the identified applications 133. Alternatively, a user of the client device 106 is prompted to select one of the authorized applications 133.

The management component 139 facilitates the application 133 being used to perform an action in various ways. In one example, the management component 139 prompts the user of the client device 106 to switch to the authorized application 133 in order to perform the action. Alternatively, the management component 139 automatically initiates the execution of the authorized application 133 and terminates execution of the unauthorized application 133. In some examples, content that was generated using the unauthorized application 133 is copied so that the authorized application 133 processes the content. In this way, the content that a user generated using an unauthorized application 133 is automatically transferred for use by an authorized application 133.

Figure 6:
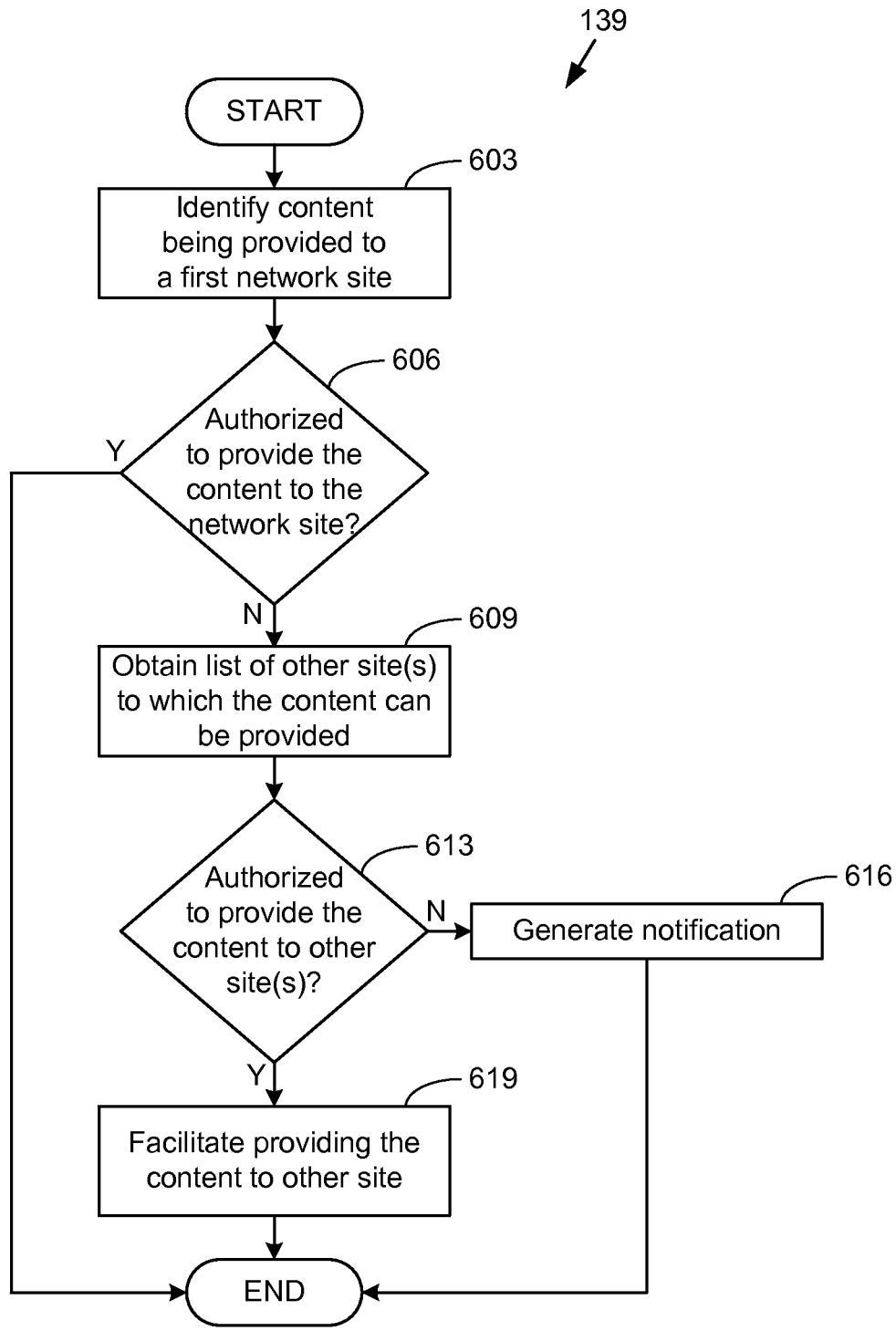

With reference to FIG. 6, shown is a flowchart that provides another example of the operation of a portion of the management component 139. In particular, FIG. 6 provides an example of the management component 139 identifying that a first application 133 (FIG. 1) is not authorized to be used to provide content to a particular network site and in response, facilitating the content being provided to an alternative network site. It is understood that the flowchart of FIG. 6 provides merely an example of the many different types of functional arrangements that may be employed to implement the operation of the portion of the management component 139 as described herein. As an alternative, the flowchart of FIG. 6 may be viewed as depicting an example of elements of a method implemented in the client device 106 (FIG. 1) according to one or more embodiments.

Beginning with element 603, the management component 139 identifies content being provided from the client device 106 to a first network site. In some embodiments, the management component 139 identifies the content by comparing text that was input to a network page browser to a list of words or phrases that are indicative of various types of content. As an example, the management component 139 concludes that the name of a secret enterprise project, "Project Xylophone" indicates that content associated with an enterprise is being provided to a network site.

The management component 139 then moves to element 606 and identifies whether the client device 106 is authorized to provide the content to the network site. In some examples, the management component 139 consults the compliance rules 143 to identify whether the client device 106 is authorized by the management system 116 to provide the identified content to the network site. If the management component 139 identifies that the client device 106 is authorized to provide the content to the network site, the process ends.

Otherwise, if the management component 139 identifies that the client device 106 is not authorized to provide the content to the network site, the management component 139 moves to element 609. As indicated at element 609, the management component 139 then obtains a list of one or more other network sites to which the content can be provided. At element 613, the management component 139 then identifies whether the client device 106 is authorized to provide the content to any of the network sites that are included in the list that was obtained in element 609.

If the client device 106 is not authorized to provide the content to one or more of the network sites that are included in the list, the management component 139 moves to element 616 and performs a remedial action. Examples of a remedial action include generating a notification, blocking transmission of data, terminating execution of an application 133, locking the client device 106, and deleting data from the client device 106. In some examples, a notification is transmitted from the client device 106 to the management system 116 over the network 109 (FIG. 1) to notify the management system 116 that the client device 106 is providing the content to the network site. In other examples, a notification may be presented to a user of the client device 106 to notify the user that the client device 106 is not authorized to provide the content to the network site.

Otherwise, if the client device 106 is authorized to provide the content to a network site that is included in the list, the management component 139 moves to element 619 and facilitates providing the content to that network site. If the client device 106 is authorized to provide the content to more than one network site that is included in the list, the management component 139 selects one of the network sites. Alternatively, the management component 139 prompts a user of the client device 106 to select one of the authorized network sites.

As described above, the management component 139 facilitates providing the content to the authorized network site in various ways. In one example, the management component 139 causes a notification to be displayed by the client device 106, and the notification prompts the user of the client device 106 to access the authorized network site. Alternatively, the management component 139 automatically directs the browser application to the other network site. Additionally, in some examples, the content that was generated for the unauthorized network site is copied by the management component 139 so that the content is provided to the authorized network site. Thus, the management component 139 facilitates a user posting content to a network site that the management system 116 authorizes for that purpose.

Figure 7:
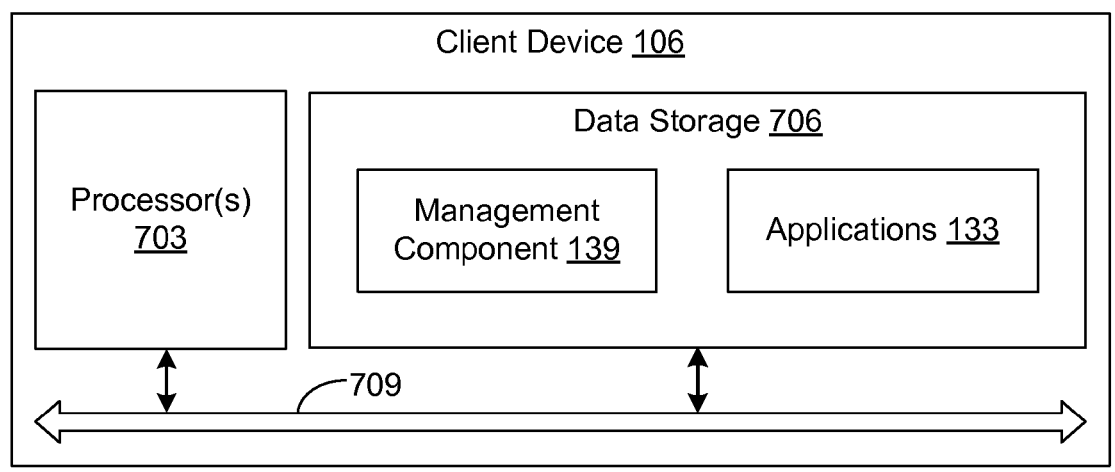
FIG. 7 is a schematic block diagram that illustrates an example of the client device in the networked environment of FIG. 1 according to various embodiments of the present disclosure.

With reference to FIG. 7, shown is a schematic block diagram of the client device 106 according to an embodiment of the present disclosure. The client device 106 includes at least one processor circuit having, for example, a processor 703 and data storage 706, both of which are coupled to a local interface 709. The local interface 709 may comprise, for example, a data bus with an accompanying address/control bus.

Data and components that are executable by the processor 703 may be stored in the data storage 706. For example, the management component 139 and potentially other components may be stored in the data storage 706. In addition, an operating system may be stored in the data storage 706 and be executable by the processor 703. The data storage 706 may comprise, for example, random access memory (RAM), read-only memory (ROM), one or more disk drives, or memory cards.

The processor 703 may represent multiple processors 703 or multiple processor cores. In such cases, the local interface 709 may be an appropriate network that facilitates communication between any of the processors 703 or data storage 706. In some examples, the local interface 709 comprises systems, such as load balancing systems, to coordinate communication between multiple processors 703 or multiple processor cores.

In some examples, the management component 139 and other systems described herein are embodied as software or code that is executed by hardware. In alternative examples, the management component 139 or other systems are embodied as hardware or a combination of software, code, or hardware. Also, any component described herein, including the management component 139, that comprises software or code may be embodied in any suitable non-transitory computer-readable medium for use by or in connection with an instruction execution system.

Any component described herein, including the management component 139, may be implemented and structured in a variety of ways. For example, the management component 139 or other components may be implemented using one or more modules of a single software system. Alternatively, the management component 139 or other components may be implemented using multiple modules that are distributed across multiple software systems. Additionally, it is understood that terms, such as "component," "service," "system," "engine," "module," and so on, may be interchangeable and are not intended to be limiting unless indicated otherwise.

The flowcharts of FIGS. 5-6 show examples of the functionality and operation portions of the management component 139. If embodied in software, each block may represent a module, segment, or portion of code that comprises program instructions to implement the specified logical function(s). If embodied in hardware, each block may represent a circuit or a number of interconnected circuits to implement the specified logical function(s).

Although the flowcharts of FIGS. 5-6 show a specific order of execution, it is understood that the order of execution may differ from that which is depicted. For example, the order of execution of two or more elements may be switched relative to the order shown. Also, two or more elements shown in succession in FIGS. 5-6 may be executed concurrently or with partial concurrence. Further, in some embodiments, one or more of the elements shown in FIGS. 5-6 may be skipped or omitted. In addition, any number of counters, state variables, warning semaphores, or messages might be added to the logical flow described herein, for purposes of enhanced utility, accounting, performance measurement, or providing troubleshooting aids. It is understood that all such variations are within the scope of the present disclosure.

It is emphasized that the above-described embodiments of the present disclosure are merely possible examples of implementations to set forth for a clear understanding of the principles of the disclosure. Many variations and modifications may be made to the above-described embodiments without departing substantially from the spirit and principles of the disclosure. All such modifications and variations are intended to be included herein within the scope of this disclosure.

Therefore, the following is claimed:

1. A non-transitory computer-readable medium embodying program instructions executable in a client device, wherein the program instructions, when executed, cause the client device to at least:
  identify content associated with an action being performed using a first application in the client device;
  determine that the content is associated with an enterprise;
  determine, in response to identifying that the content is associated with the enterprise, that the first application is not authorized to perform the action; and
  in response to determining that the first application is not authorized to perform the action, facilitate a second application to perform the action by copying the content from the first application to the second application.

2. The non-transitory computer-readable medium of claim 1, wherein the program instructions, when executed, further cause the client device to at least:
  prior to facilitating the second application being used to perform the action, identify that the second application is authorized to be used to perform the action.

3. The non-transitory computer-readable medium of claim 1, wherein the action is identified using a keyboard application that is provided by the enterprise.

4. The non-transitory computer-readable medium of claim 1, wherein the program instructions, when executed, further cause the client device to determine whether the first application is authorized to be used to perform the action by at least determining whether a compliance rule indicates that the first application is authorized to be used to perform the action.

5. The non-transitory computer-readable medium of claim 1, wherein the action comprises composing a message, and wherein the program instructions, when executed, further cause the client device to identify that the action is associated with the enterprise by at least identifying that an intended recipient of the message comprises an enterprise contact.

6. The non-transitory computer-readable medium of claim 1, wherein the action comprises processing a message, and wherein the program instructions, when executed, further cause the client device to identify that the action is associated with the enterprise by at least identifying that an attachment of the message comprises enterprise data.

7. The non-transitory computer-readable medium of claim 1, wherein the program instructions, when executed, further cause the client device to render a message that prompts a user to activate the second application.

8. A method, comprising:
identifying, using a client device, content being provided to a first network site using an application in the client device;
determining, using the client device, that the content is associated with an enterprise;
determining, using the client device, that the client device is not authorized to provide the content to the first network site based on the content being associated with the enterprise;
identifying, using the client device, a second network site to which the client device is authorized to provide the content; and
in response to identifying the second network site, copying, using the client device, the content from the first network site to the second network site.

9. The method of claim 8, further comprising identifying, using the client device, that the client device is authorized to provide the content to the second network site.

10. The method of claim 8,
wherein the enterprise operates a management system associated with the client device.

11. The method of claim 10, wherein identifying that the content is associated with the enterprise further comprises comparing the content to a list that comprises a plurality of words associated with the enterprise.

12. The method of claim 8, further comprising identifying that the first network site comprises a social networking site.

13. The method of claim 8, further comprising transmitting, from the client device, a notification to a management system for the client device, wherein the notification indicates that the client device is being used to provide the content to the first network site.

14. A system comprising:
a client device;
instructions executable on the client device, wherein the instructions, when executed, cause the client device to at least:
identify content associated with an action being performed using a first application in the client device;
determine that the content is associated with an enterprise;
determine, in response to identifying that the content is associated with the enterprise, that the first application is not authorized to perform the action; and
in response to determining that the first application is not authorized to perform the action, facilitate a second application to perform the action by copying the content from the first application to the second application.

15. The system of claim 14, wherein the instructions, when executed, further cause the client device to at least:
prior to facilitating the second application being used to perform the action, identify that the second application is authorized to be used to perform the action.

16. The system of claim 14, wherein the action is identified using a keyboard application that is provided by the enterprise.

17. The system of claim 14, wherein the instructions, when executed, further cause the client device to determine whether the application is authorized to be used to perform the action by at least determining whether a compliance rule indicates that the application is authorized to be used to perform the action.

18. The system of claim 14, wherein the action comprises composing a message, and wherein the instructions, when executed, further cause the client device to identify that the action is associated with the enterprise by at least identifying that an intended recipient of the message comprises an enterprise contact.

19. The system of claim 14, wherein the action comprises processing a message, and wherein the application further causes the client device to identify that the action is associated with the enterprise by at least identifying that an attachment of the message comprises enterprise data.

20. The system of claim 14, wherein the instructions, when executed, further cause the client device to render a message that prompts a user to activate the second application.

* * * * *